(12) United States Patent
Dalgleish et al.

(10) Patent No.: US 6,580,899 B1
(45) Date of Patent: Jun. 17, 2003

(54) ADAPTIVE FORWARD POWER MANAGEMENT ALGORITHM FOR TRAFFIC HOTSPOTS

(75) Inventors: Robert Dalgleish, Richardson, TX (US); Martin Kendall, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 489 days.

(21) Appl. No.: 09/657,109

(22) Filed: Sep. 7, 2000

(51) Int. Cl.$^7$ ................................................ H04B 1/10
(52) U.S. Cl. ........................................ 455/69; 455/522
(58) Field of Search .................... 455/522, 69, 13.4, 455/134, 226.2

(56) References Cited

U.S. PATENT DOCUMENTS

| | | | | |
|---|---|---|---|---|
| 5,974,041 A | * | 10/1999 | Kornfeld et al. | 370/342 |
| 5,987,333 A | | 11/1999 | Sole | |
| 6,058,107 A | * | 5/2000 | Love et al. | 370/332 |
| 6,064,659 A | * | 5/2000 | Rohani et al. | 370/318 |
| 6,118,767 A | * | 9/2000 | Shen et al. | 370/252 |
| 6,223,056 B1 | * | 4/2001 | Appel | 455/561 |
| 6,311,070 B1 | * | 10/2001 | Tong et al. | 455/522 |
| 6,317,435 B1 | * | 11/2001 | Tiedemann et al. | 370/441 |
| 6,351,650 B1 | * | 2/2002 | Lundby et al. | 455/522 |
| 6,370,392 B1 | * | 4/2002 | Li et al. | 455/522 |
| 6,396,867 B1 | * | 5/2002 | Tiedemann et al. | 375/141 |
| 2001/0006888 A1 | * | 7/2001 | Posti et al. | 455/69 |
| 2001/0031624 A1 | * | 10/2001 | Schmutz | 455/13.4 |
| 2002/0160800 A1 | * | 10/2002 | Rozmaryn | 455/522 |

OTHER PUBLICATIONS

Song Lei; Narayan B. Mandayam and Zoran Gajic; "Analysis of an Up/Down Control Algorithm for the CDMA Reverse Link Under Fading;" Rutgers University; Sep. 1999.

Sampath, Ashwin; P. Sarath Kuman and Jack M. Holtzman; "Power Control and Resource Management for a Multimedia CDMA Wireless System;" Rutgers University; 1998.

Yates, Roy D.; "A Framework for Uplink Power Control in Cellular Radio Systems;" Rutgers University; May 13, 1996.

Hanly, S.V. and D.N. Tes; "Power Control and Capacity of Spread Spectrum Wireless Networks;" University of California–Berkeley; Jul. 8, 1999.

* cited by examiner

*Primary Examiner*—Thanh Cong Le
*Assistant Examiner*—Tan Trinh
(74) *Attorney, Agent, or Firm*—Storm & Hemingway

(57) ABSTRACT

The present invention provides greater capacity in a dynamic allocation of power. First, the invention requires the reduction, not the increase, of signal power in low traffic areas. Because this signal power reduction reduces interference in surrounding high traffic cell site areas, those high traffic cell site areas can re-direct some of this surplus power to support a greater voice and data traffic load. Accordingly, the invention increases capacity of voice and data communications in high traffic areas, where it is needed most, by lowering (and dynamically regulating) the signal power in low traffic cell site areas.

33 Claims, 2 Drawing Sheets

ADAPTIVE FORWARD POWER MANAGEMENT ALGORITHM FOR TRAFFIC HOTSPOTS

TECHNICAL FIELD OF THE INVENTION

This invention relates generally to code division multiple access ("CDMA") cellular telephone systems and, more particularly, to a method of optimally managing forward link power in a CDMA system.

BACKGROUND OF THE INVENTION

A typical cellular communication system is comprised of multiple cell sites covering a geographic region. Each cell site supports radiotelephone communication with a mobile unit within a service area through at least one antenna and a base station transceiver substation ("BTS"). The mobile unit is sometimes called a subscriber unit, and the mobile unit supports the voice and data communication from a subscriber or mobile unit user in the cell site service area. The BTS, sometimes called the base station, provides wireless communications coverage within the cell site service area by performing base station processing to support the CDMA common air interface to the mobile units. Mobile units in the cell site area will communicate through the antenna thereby supporting the radio communication to the BTS.

Multiple BTS units for cell site areas are coupled to a base station controller ("BSC") that will support coded voice communications and allow for the continuity of calls as mobile units travel through the cellular network. The BSC communicates with the mobile switching center ("MSC") which routes calls handled by the BSC and BTS units associated with the MSC to the public switched telephone network ("PSTN"). The cellular system may have multiple MSCs, each controlling communication traffic on a number of cell site areas. Third Generation wireless networks, which have focused on Internet applications, may adopt a more distributed architecture with network interconnection directly to the BSC.

If the cell site has a limited traffic load, a single omnidirectional antenna will be assigned to cover the entire cell site area. If traffic load in a cell site area is heavier, the cell site area can be divided into a number of sectors wherein each sector has an antenna assigned to a particular section of the cell site area. For example, a cell site area divided into three sectors may have three antennas assigned to cover 120° areas of the cell site area. In this manner, the number of communication links from the BTS to the mobile unit, called forward links, can be increased through the use of cell site sectors. The communications from the mobile unit to the base station BTS are called the reverse link.

Power Allocation on Forward Link

The forward link power is the power allocated to the communication channel from the BTS to the mobile unit. The BTS determines how much power to dedicate to each mobile unit in the cell site area so as to maintain sufficient signal quality. The BTS controls the amount of power allocated to each mobile unit on the system based on the distance of the mobile unit from the antenna assigned to the cell or sector, as well as other factors such as shadow fading (buildings, terrain obstacles) and small scale fading (relay losses, multipath fading, local scattering losses). The BTS can also adjust the overall power of the signal transmitted to the mobile unit.

The number of simultaneous users allowed to use the cellular communication system in a particular cell site area is restricted by the amount of forward link power available to support communications with the mobile units. More specifically, the maximum number of users, or capacity on the cell site, is limited by the number of forward links that can be supported at any given time and the amount of power available to the BTS to transmit the forward link signals. As such, the allocation of forward link power is one of the most important resources in the cellular communication system.

Increasing Power Allocations and Interference

In order to support more users per cell site area and increase capacity on the cellular system, it would make sense for the cell site to increase the power allocated to the forward link communications to be shared among more users. Increasing this forward link power allocation, however, has a significant negative effect on surrounding cell site areas because of signal interference created by the increased radiated power. This interference in surrounding cell site areas can be overcome by a corresponding increase in the amount of forward link signal power in these surrounding cells. The increase in signal power in the surrounding cell site areas, however, increases the total amount of interference in the system, as well as the interference level in the first cell site.

Accordingly, increasing the forward link power signal is not the solution to increasing capacity on the system. In fact, increasing the forward link power leads to a redundant cycle of the greater interference, and then, the need for greater signal power to overcome that interference. To avoid this outcome, the BTS in each cell site area have been known to maintain the signal power in a manner that is less than the ratio of forward link signal power to power creating interference, also called $P_{desired\ signal}/P_{interference}$. This ratio is maintained in order to maintain an acceptable level of interference while transmitting the desired signal at an acceptable power level for signal quality.

SUMMARY OF THE INVENTION

The present invention provides greater capacity in a dynamic allocation of power. First, the invention requires the reduction, not the increase, of signal power in low traffic areas. Because this signal power reduction reduces interference in surrounding high traffic cell site areas, those high traffic cell site areas can re-direct some of this surplus power to support a greater voice and data traffic load. Accordingly, the invention increases capacity of voice and data communications in high traffic areas, where it is needed most, by lowering (and dynamically regulating) the signal power in low traffic cell site areas.

In the CDMA system, there are traffic channels and overhead channels. The traffic channels carry voice and data communications, while the overhead channels supervise and control the communications traffic on the cellular system. The overhead channels include a pilot signal, paging channel, synchronization channel, and a control channel. The system must always allocate some of the available forward link power for the support of these overhead channels.

When a mobile unit moves from one cell site area to another cell site area, the continuity of the call is maintained by a "soft hand-off" routine. In the "soft hand-off routine," the antenna assigned to handle the communication between the mobile units will be switched to the new antenna in the second cell site area. When a mobile unit moves from one cell site sector to another sector (but within the same cell site area), the continuity of the call must be maintained by a "softer hand-off routine."

New users entering a new sector or cell site area via these "soft hand-off" and "softer hand-off" routines have an extremely high priority in the allocation of available power and communication channels because the continuity of existing calls in the cellular system is extremely important. The system must always allocate a portion of the available forward link power to handle mobile units entering the sector or cell site area via a hand-off routine. After the forward link power has been allocated for overhead channel support and hand-off reserves, the remaining forward link power is used to support voice and data traffic channels.

The present invention reduces signal power requirements in the system by reducing, and dynamically regulating, the power in low traffic cell site areas. The reduced signal power used in these low traffic cell site areas will reduce the interference in surrounding the cell site areas. With reduced interference in the surrounding cell site areas, the surrounding cell sites can redirect some of the power formerly used to overcome higher levels of interference. This redirected surplus power can be used to support more traffic channels thereby increasing the capacity of the surrounding cell site area. The call capacity is increased in the system without increasing the overall power level at the cell sites and with a decrease in the overall signal interference on the cellular network.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

The invention uses a cellular network having a cell site area controlled by a BTS and at least one antenna. The invention would also include the cellular system components, such as the BSC and MSC or equivalent, coupled to support cellular communications.

Figure 1:
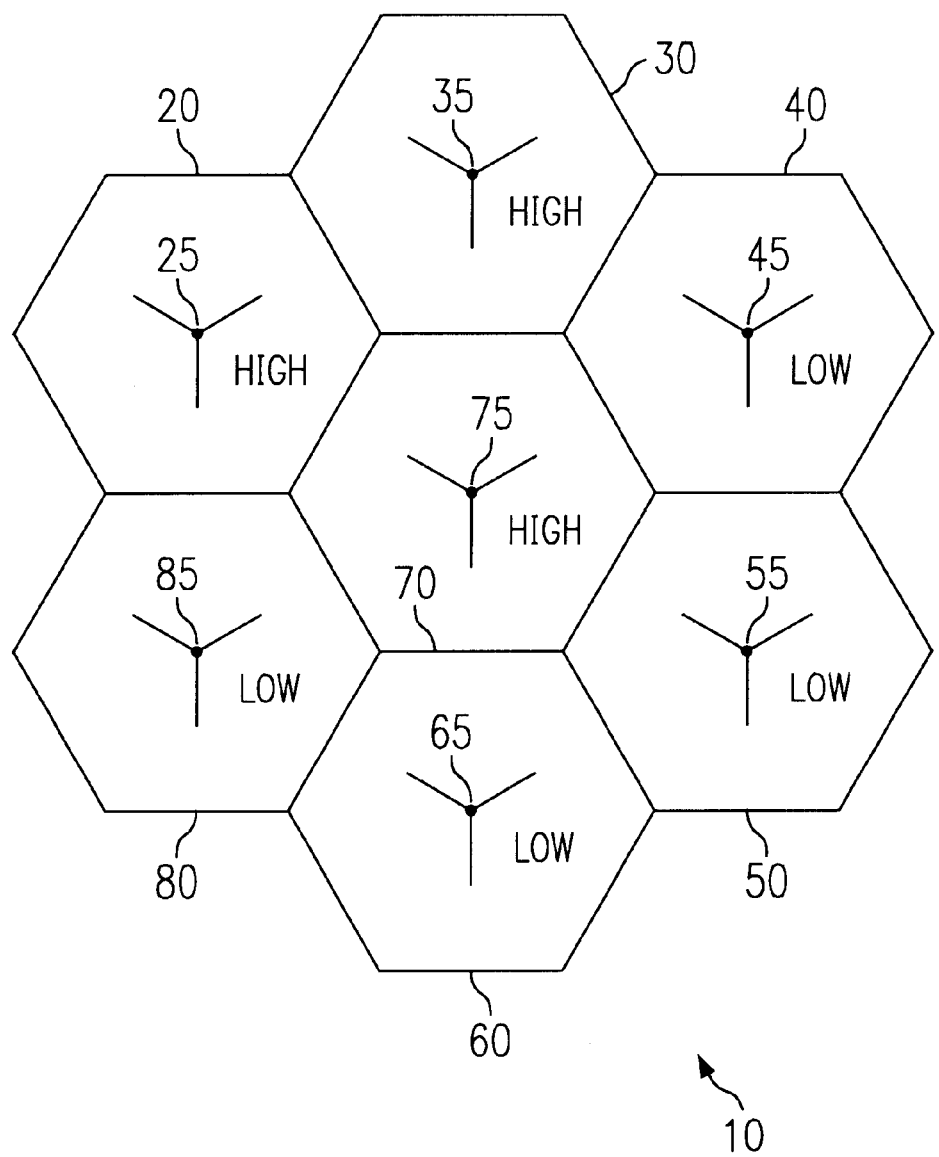
FIG. 1 is a schematic diagram of the certain cell site areas in a cellular network.

In FIG. 1, seven contiguous cell site areas 20, 30, 40, 50, 60, 70, and 80 are shown for the portion of the cellular area 10. The cell site areas each have an antenna, or group of antennas, 25, 35, 45, 55, 65, 75 and 85, respectively, for communication with the mobile units in the respective cell site areas.

In cell site areas 40, 50, 60, and 80 are low traffic cell site areas. In other words, the voice and data communications traffic is not as heavy in these cell site areas compared to surrounding cell site areas. The traffic levels in cell site areas 30, 70 and 20, on the other hand, are quite a bit higher. The invention will reduce the signal power in the low traffic cell site areas 40, 50, 60 and 80. This reduction in signal power in these low traffic cell site areas will result in decreased interference levels in the surrounding cell site areas including cell sites 30, 70 and 20. Because the interference levels are reduced in the high traffic cell sites 30, 70 and 20, a signal power surplus will arise from the unused power previously needed to counteract the higher interference levels in the cell site area.

The signal power that was being used to counteract interference in the cell site areas 30, 70 and 20 can be redirected to support additional voice and data traffic channels. As such, the reduction in signal strength in the low traffic areas indirectly results in an increased capacity in the higher traffic cell sites. In this manner, the invention allows for increased traffic capacity where it is needed most—the high traffic "hot spots" in the cellular network.

Figure 2:
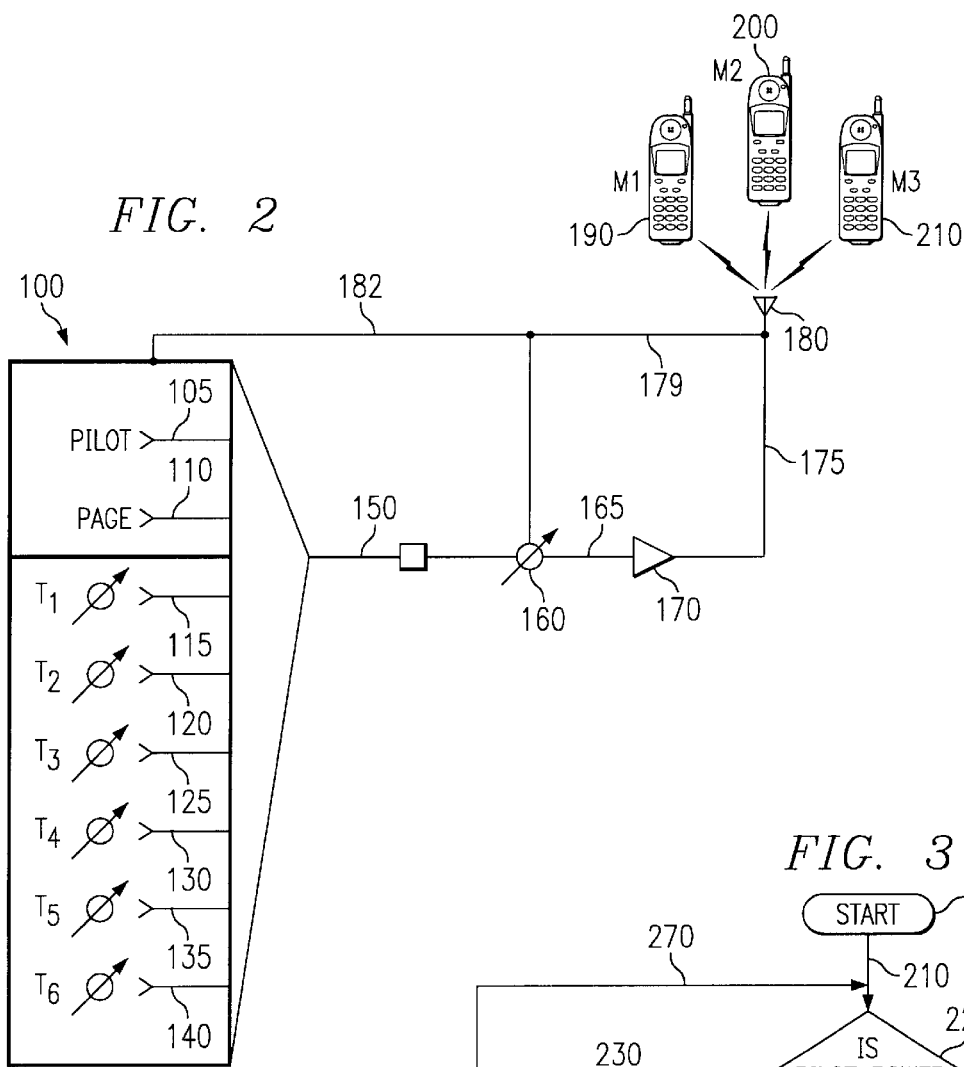
FIG. 2 is a schematic diagram of the feedback loop used in the present invention; and, and, FIG. 3 is a flow chart for the dynamic partitioning protocol for the forward link power allocation.

Reducing signal strength, however, must be done dynamically with a feed-back loop to make sure the signal strength is not reduced to a point where the signal strength is insufficient for good quality of service. In order to obtain the appropriate balance in signal strength, a feed-back loop is used to make the appropriate signal strength adjustments. The feedback loop described below is a practical description which focuses on the relevant mechanisms in the feed-back loop. This feed-back loop will dynamically adjust the signal strength to the particular needs of the cell site area at a particular time. As shown in FIG. 2, the input power channels 100 for a representative cell site area includes the overhead pilot channel 105 and page channel 110, as well as the traffic channels $T_1$ to $T_6$, (designated 115, 120, 125, 130, 135, and 140, respectively). The traffic channel strength is regulated on an individual basis by the individual power adjustors coupled to $T_1$ to $T_6$.

The overhead and traffic channels are combined on line 150 for transmission to the Master Power Adjustor (MPA) 160. The MPA 160 regulates the overall signal strength for the cell site area. The adjusted signal is transferred from MPA 160 to the amplifier 170 along line 165. The amplified signal is transferred to the antenna 180 via line 175. The signal is transmitted by antenna 180 to the respective mobile units Ml 190, $M_2$ 200 and $M_3$ 210.

A feedback loop 179 indicates the overall power $P_{in}$ being transmitted by the cell site, including overhead and traffic signal strength after amplification in amplifier 170. The overall power $P_{in}$ signal is used to indicate the composite output power level. While the output signal itself is used in this example, there may be other signals that could also indicate output signal power.

A second feedback loop 182 provides data to the MPA regarding the pilot power and the average power for the traffic channels as determined by the CDMA power control algorithms. The pilot power setting is constant and used as an indicator of signal strength, and the instantaneous average of the traffic channel strengths over all users provides information on the average quality of the signal strength at the handset. While pilot power and the average value of all the traffic channels are used in this embodiment, other values could be used to determine the input signal strength and the strength of the traffic channels.

As the system operates, the MPA 160 will dynamically regulate the overall signal strength on the cell site to match the appropriate level of traffic in the cell site area. This dynamic power adjustment allows the system to use the exact amount of power needed for a given traffic load without exceeding the required level resulting in wasted power and increased interference. Further, the dynamic power adjustment will periodically check the signal strength to make sure a minimum level of power provides sufficient signal strength for quality of service.

Figure 3:
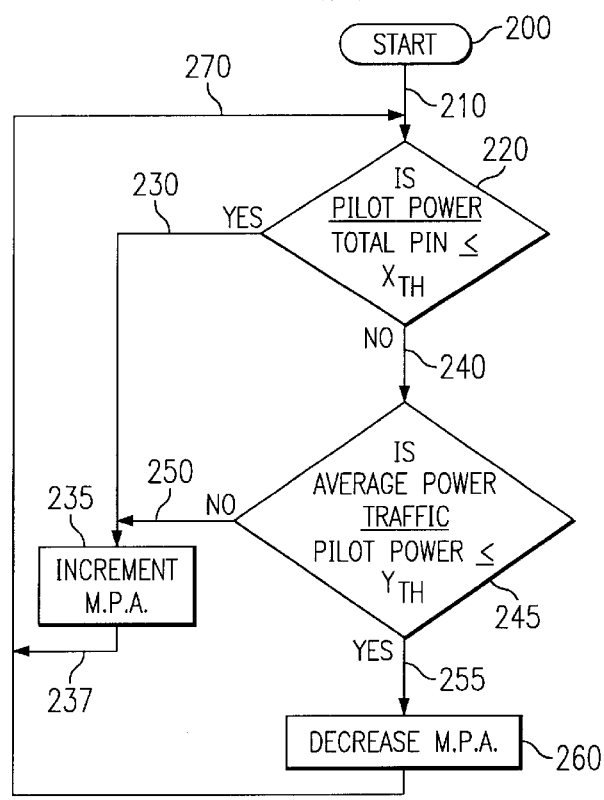

In FIG. 3, the flowchart for the adaptive forward power management protocol starts at step 200 before proceeding to step 220 via path 210. At step 220, the ratio of pilot power to total power $P_{in}$ is compared to a first threshold value, $X_{th}$. The pilot power value is indicative of the signal strength while the total power includes the power allocated for the overhead and traffic channels. The threshold value, $X_{th}$, is determined based on system parameters. (A sample value might be 0.1).

If the pilot power/$P_{in}$ ratio is less than $X_{th}$ value, the protocol determines that signal strength needs to be increased to make sure input signal power $P_{in}$ always exceeds the pilot power signal strength. In the ratio is less than $X_{th}$, the adaptive forward power management protocol proceeds along path 230 to step 235 where the MPA will increase the overall signal strength for the cell site area.

If the pilot power/$P_{in}$ ratio exceeds the $X_{th}$ value, the protocol will proceed via route 240 to the step 245 where the ratio of average power for traffic channels to pilot power is analyzed. If the second ratio is not less than or equal to a second threshold value, $Y_{th}$ (for example, value=0.5) the protocol determines that average traffic signal strength is greater than the pilot power—a power level indicative of the overall signal strength. In this event, the protocol will proceed via path 250 to the step 235 so the MPA will increase the signal strength.

If the average traffic signal strength to pilot power ratio is less than the $Y_{th}$ value, the protocol will assume that total signal strength could be reduced. As such, the protocol proceeds to step 260 via 255, and in step 260 the MPA would decrease the power to cell site area. After processing at step 260, the protocol will proceed along line 270 to procedure path 210. In this manner, the total signal strength is dynamically fluctuating to effectively regulate the power signal in light of the ever-changing traffic load in a cell site area.

While the invention has been particularly shown and described with respect to preferred embodiments, it will be readily understood that minor changes in the details of the invention may be made without departing from the spirit of the invention. Having described the invention,

We claim:

1. A wireless communication system serving at least one mobile unit operating within a cell site service area, the wireless communications system comprising:
   a cell site service area having at least one antenna and a base station, the base station provides wireless coverage with the service area, establishes a forward link and a reverse link with the mobile unit, communications transmitted to the mobile unit on the forward link and communications received from the mobile unit on the reverse link;
   a power manager in the base station, the power manager dynamically regulates forward link signal power to the mobile units based upon a feed-back loop having a plurality of feed-back inputs to analyze the particular power levels and traffic load for the cell site service area.

2. The system of claim 1 further comprising:
   the power manager uses a first feed-back input indicative of a composite output power level.

3. The system of claim 2 further comprising:
   the input indicative of composite output power level is the output power signal transmitted from the base station.

4. The system of claim 1 further comprising:
   the power manager uses a second feed-back input indicative of the input signal power used by the base station.

5. The system of claim 4 further comprising:
   the input indicative of the input signal power is the pilot power signal.

6. The system of claim 4 further comprising:
   the power manager uses a first feed-back input indicative of composite output power level.

7. The system of claim 6 further comprising:
   the input indicative of composite output power level is the output power signal transmitted from the base station.

8. The system of claim 1 further comprising:
   the power manager uses a third feed-back input indicative of the average traffic channel signal strength.

9. The system of claim 8 further comprising:
   the input indicative of average traffic channel signal strength is the average power of the traffic channels.

10. The system of claim 8 further comprising:
    the power manager uses a first feed-back input indicative of composite output power level.

11. The system of claim 10 further comprising:
    the input indicative of composite output power level is the output power signal transmitted from the base station.

12. The system of claim 8 further comprising:
    the power manager uses a first feed-back input indicative of composite output power level.

13. The system of claim 12 further comprising:
    the signal indicative of composite output power level is the output power signal.

14. The system of claim 1 further comprising:
    the input indicative of traffic channels signal strength is the average traffic channel strength.

15. A wireless communication system serving at least one mobile unit operating within a cell site service area, the wireless communications system comprising:
    a cell site service area having at least one antenna and a base station, the base station provides wireless coverage with the service area, establishes a forward link and a reverse link with the mobile unit, communications transmitted to the mobile unit on the forward link and communications received from the mobile unit on the reverse link;
    a power manager in the base station, the power manager dynamically regulates signal power to the mobile units based upon a feed-back loop having a plurality of feed-back inputs to analyze the particular traffic load for the cell site, including a first feed-back input indicative of composite output power level, a second feed-back input indicative of the input power signal, and a third feed-back input indicative of the traffic channels signal strength.

16. The system of claim 15 further comprising:
    the input indicative of composite output power level is the output power signal transmitted from the base station.

17. The system of claim 14 further comprising:
    the input indicative of the input signal power is the pilot power signal.

18. The system of claim 14 further comprising:
    the input indicative of composite output power level is the output power signal transmitted from the base station, the input indicative of the input signal power is the pilot power signal, and the input indicative of traffic channels signal strength is the average traffic channel power.

19. A method of operating a wireless communication system that services at least one mobile unit operating in a cell site service area, the method comprising the steps of:
    providing a cell site service area having an antenna and a base station,
    establishing a forward link and a reverse link between a base station and a mobile unit operating in the cell site service area, communications transmitted to the mobile unit from the base station on the forward link and communications transmitted to the base station from the subscriber unit on the reverse link;
    determining a power level for an output signal being transmitted to mobile units operating in the cell site service area;

determining a power level for the input power signal power being used by the base station for transmissions to the cell site service area;

determining a power level for a traffic signal for the traffic communication channels to the mobile units operating in the cell site service area;

incrementing the output signal power level if the total output signal power decreases below a first threshold level of the input signal power;

incrementing the output signal power level if the input signal power used by the base station level exceeds the traffic signal power; and, decreasing the output signal power level if the input signal power decreases below a second threshold level of the traffic signal power.

20. The method of claim 19 further comprising the step of:

determining the output signal power level based upon the output power signal transmitted from the base station.

21. The method of claim 19 further comprising the step of:

determining the input signal power based upon the pilot signal power.

22. The method of claim 19 further comprising the step of:

determining the signal strength for the traffic signals based upon the average power of the traffic signals.

23. The method of claim 19 further comprising the steps of:

determining the output signal power level based upon the output signal power transmitted from the base station;

determining the input signal power based upon the pilot signal power; and, determining the signal strength for the traffic signals based upon the average power of the traffic signals.

24. A method of operating a wireless communication system that services at least one mobile unit operating in a cell site service area, the method comprising the steps of:

providing a cell site service area having an antenna and a base station, establishing a forward link and a reverse link between a base station and a mobile unit operating in the cell site service area, communications transmitted to the mobile unit from the base station on the forward link and communications transmitted to the base station from the subscriber unit on the reverse link;

determining a power level for an output signal being transmitted to mobile units in the cell site area;

determining a power level for the input signal power to the cell site;

determining a power level for a traffic signal for the traffic communication channels to the mobile units;

incrementing the output signal power level if the total output signal power decreases below a first threshold level of the input signal power;

incrementing the output signal power level if the input signal power level exceeds the traffic signal power.

25. The method of claim 24 further comprising the step of:

determining the output signal power level based upon the output signal power transmitted from the base station.

26. The method of claim 24 further comprising the step of:

determining the input signal power based upon the pilot signal power.

27. The method of claim 24 further comprising the step of:

determining the signal strength for the traffic signals based upon the average power of the traffic channels signals.

28. The method of claim 24 further comprising the steps of:

determining the output signal power level based upon the output signal power transmitted from the base station;

determining the input signal power based upon the pilot signal power; and, determining the signal strength for the traffic signals based upon the average power of the traffic channels signals.

29. A method of operating a wireless communication system that services at least one mobile unit operating in a cell site service area, the method comprising the steps of:

providing a cell site service area having an antenna and a base station, establishing a forward link and a reverse link between a base station and a mobile unit operating in the cell site service area, communications transmitted to the mobile unit from the base station on the forward link and communications transmitted to the base station from the subscriber unit on the reverse link;

determining a power level for an output signal being transmitted to mobile units in the cell site area;

determining a power level for the input signal power to the cell site;

determining a power level for a traffic signal for the traffic communication channels to the mobile units;

incrementing the output signal power level if the total output signal power decreases below a first threshold level of the input signal power; and, decreasing the output signal power level if the input signal power decreases below a second threshold level of the traffic signal power.

30. The method of claim 29 further comprising the step of:

determining the output signal power level based upon the output signal power transmitted from the base station.

31. The method of claim 29 further comprising the step of:

determining the input signal power based upon the pilot signal power.

32. The method of claim 29 further comprising the step of:

determining the signal strength for the traffic signals based upon the average power of the traffic channel signals.

33. The method of claim 29 further comprising the steps of:

determining the output signal power level based upon the output signal power transmitted from the base station;

determining the input signal power based upon the pilot signal power; and, determining the signal strength for the traffic signals based upon the average power of the traffic channels signals.

* * * * *